US010133704B2

(12) United States Patent
Kota et al.

(10) Patent No.: US 10,133,704 B2
(45) Date of Patent: Nov. 20, 2018

(54) DYNAMIC LAYOUT OF CONTENT IN A GRID BASED APPLICATION

(71) Applicant: Microsoft Technology Licensing, LLC, Redmond, WA (US)

(72) Inventors: Gergely Kota, Redmond, WA (US); Tsu-Chuan Chao, Toronto (CA); Yong Woo Rhee, Seattle, WA (US); Abbott Lowell, Andover, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 507 days.

(21) Appl. No.: 13/671,249

(22) Filed: Nov. 7, 2012

(65) Prior Publication Data

US 2014/0129910 A1    May 8, 2014

(51) Int. Cl.
*G06F 17/20* (2006.01)
*G06F 17/21* (2006.01)
*G06F 9/451* (2018.01)

(52) U.S. Cl.
CPC ............ *G06F 17/211* (2013.01); *G06F 9/451* (2018.02)

(58) Field of Classification Search
CPC .. G06F 17/30017; G11B 27/034; G11B 27/34
See application file for complete search history.

(56) References Cited

U.S. PATENT DOCUMENTS 5,796,401 A    8/1998  Winer
5,838,317 A *  11/1998 Bolnick ................ G06F 3/0481
                                                   715/764
6,128,655 A *  10/2000 Fields ............... G06F 17/30867
                                                   707/E17.109

(Continued)

FOREIGN PATENT DOCUMENTS

CN        1610516        4/2005
CN        1716252        1/2006

(Continued)

OTHER PUBLICATIONS

Microsoft™ Community, "How can the date created be later than the date modified," (Nov. 3, 2012) (online) (http://answers.microsoft.com/en-us/windows/forum/windows_xp-files/how-can-the-date-created-be-later-than-the-date/9e625c0d-8694-4c8e-8a27-3ce74687aa53?) (retrieved Nov. 2, 2015).*

(Continued)

*Primary Examiner* — Keith Bloomquist
*Assistant Examiner* — Shahid Khan

(57) ABSTRACT

Content items are obtained and dynamically arranged in tiles within columns (e.g. columns of a same size) on a display. The obtained items, along with previously obtained items that have not been rendered, are sorted based on a time such as a creation time and a modified time for the item. A determination is made using the sorting as to whether any of the items are ready to render. The determination of whether an item is ready to render may be made before all of the content items are obtained. A layout within the tile(s) for the column for the ready to render items is determined. For example, the items may be placed in tiles based on their content (e.g. text content placed in smaller sized tiles as compared to rich content). The items ready to render are then sent for rendering.

20 Claims, 10 Drawing Sheets

(56) References Cited

U.S. PATENT DOCUMENTS

| | | | |
|---|---|---|---|
| 6,993,657 B1* | 1/2006 | Renner et al. | 713/182 |
| 7,657,830 B2 | 2/2010 | Ovetchkine et al. | |
| 8,091,021 B2 | 1/2012 | Bargeron et al. | |
| 2003/0020671 A1 | 1/2003 | Santoro et al. | |
| 2006/0048045 A1* | 3/2006 | Lehenbauer et al. | 715/509 |
| 2009/0210781 A1* | 8/2009 | Hagerott | G06F 9/451 715/234 |
| 2012/0162266 A1* | 6/2012 | Douglas | G06T 11/60 345/677 |
| 2012/0284648 A1* | 11/2012 | Marshall | 715/753 |
| 2013/0055055 A1* | 2/2013 | Turcotte et al. | 715/201 |
| 2013/0283152 A1* | 10/2013 | Venkata | 715/244 |

FOREIGN PATENT DOCUMENTS

| | | |
|---|---|---|
| CN | 101867489 | 10/2010 |
| CN | 102193795 | 9/2011 |
| WO | 2007082999 A1 | 7/2007 |
| WO | 2013/044194 A2 | 3/2013 |

OTHER PUBLICATIONS

Microsoft™ Community, "How can the date created be later than the date modified," (Nov. 3, 2012) (online) (http://answers.microsoft.com/en-us/windows/forum/windows_xp-files/how-can-the-date-created-be-later-than-the-date/9e625c0d-8694-4c8e-8a27-3ce74687aa53?) (retrieved on Nov. 2, 2015).*

International Search Report and Written Opinion for PCT/US2013/068966 dated Mar. 31, 2014.

Yarmohammadi, Mahsa A, "Optimizing the Grid Layout in a Scanning Interface Based on Language Modeling", In Speech and Language Processing for Augmentative and Alternative Communication, Sep. 3, 2012, 25 pages.

"Playing with .Net-Playing Around with Microsoft Technology", Published on: Jan. 19, 2012, Available at: http://www.playingwith.net/.

"DesignGridLayout", Published on: Oct. 19, 2011, Available at: http://designgridlayout.java.net/usage.html.

"Quickstart: Defining Layouts (Windows Store Apps Using C#/VB/C++ and XAML)", Retrieved on: Sep. 3, 2012, Available at: http://msdn.microsoft.com/en-us/library/windows/apps/xaml/hh465337.aspx.

Chinese Office Action in 20138005834.6, dated Aug. 19, 2016, 10 pages.

Chinese Notice of Allowance in 20138005834.6, dated Apr. 25, 2017, 8 pages.

"Office Action Issued in European Patent Application No. 13795373.3", dated Jul. 5, 2018, 7 Pages.

* cited by examiner

DYNAMIC LAYOUT OF CONTENT IN A GRID BASED APPLICATION

BACKGROUND

There are many different ways to display content on a computing device. For example, content may be displayed in pages, in columns, in tables, and the like. The display may include content that is obtained from an external source (e.g. obtained from a network location). It can be challenging to create a desired layout for the content when it is not known how much data is going to be obtained from the external source.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Content items are obtained and dynamically arranged in different sized tiles within columns (e.g. columns of a same size) on a display. The obtained items, along with previously obtained items that have not been rendered, are sorted based on a time (e.g. a creation time). A determination is made using the sorting as to whether any of the items are ready to render. The determination of whether an item is ready to render may be made before all of the content items are obtained. Items may not obtained in the same order as the render order. A layout of the ready to render items is determined within tile(s) of the column. For example, the items may be placed in tiles based on their content (e.g. text content placed in smaller sized tiles as compared to rich content). An item may be placed in a live tile that animates a display of content that is associated with the item. The items that are determined to be ready to render are sent for rendering.

DETAILED DESCRIPTION

Figure 1:
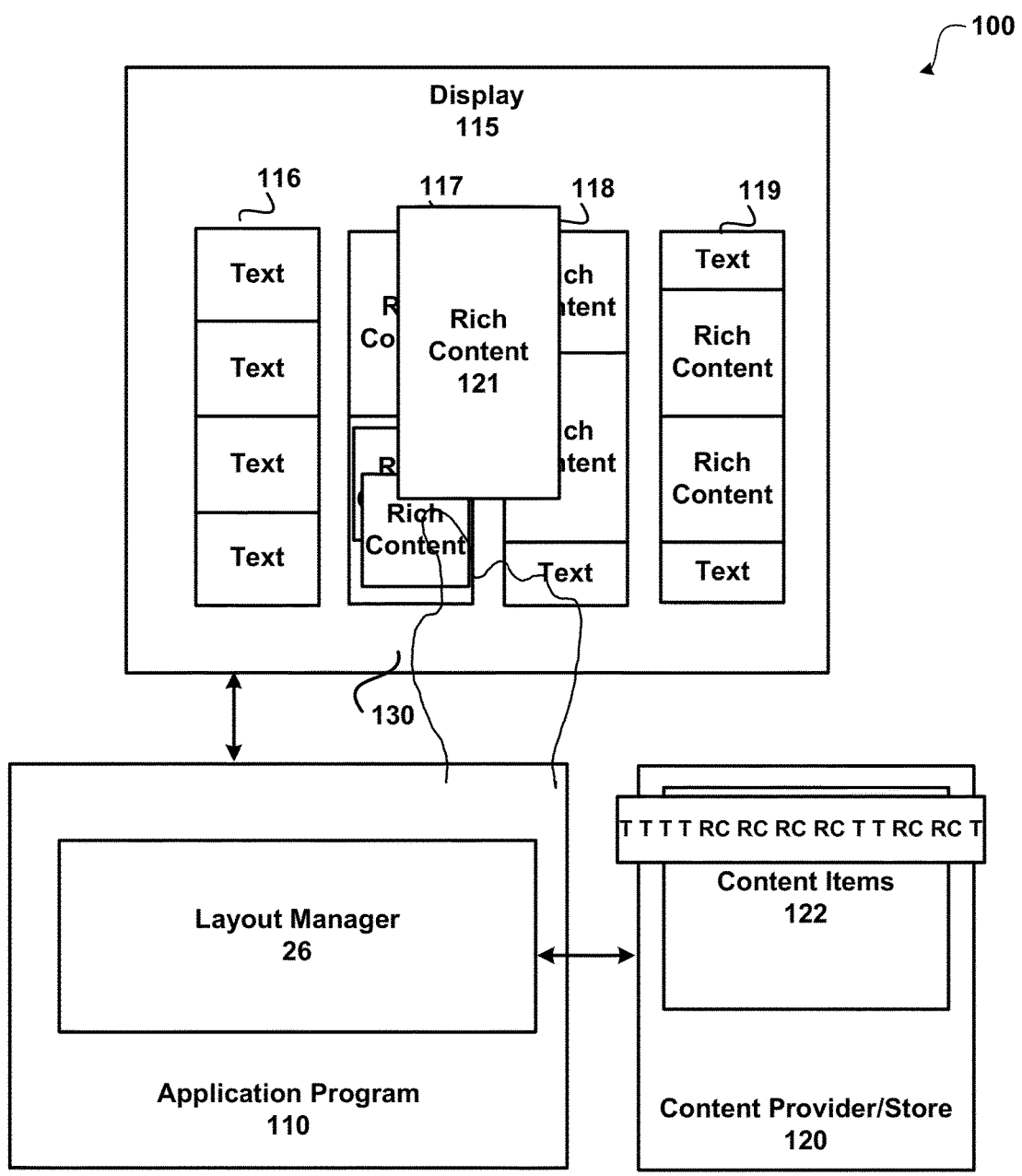
FIG. 1 shows a system for a dynamic layout of content.

Referring now to the drawings, in which like numerals represent like elements, various embodiment will be described.

FIG. 1 shows a system for a dynamic layout of content. As illustrated, system 100 includes application program 110, layout manager 26, touch screen input device/display 115, and content provider/store 120 that comprises content items 122.

In order to facilitate communication with the layout manager 26, one or more callback routines, may be implemented. According to one embodiment, application program 110 is a productivity application, such as a collaboration program such as MICROSOFT SHAREPOINT, that is configured to receive input from a touch-sensitive input device 115 and/or other input devices. For example, voice input, keyboard input (e.g. a physical keyboard and/or SIP), video based input, and the like. For example, layout manager 26 may provide information to application 110 in response to a user's gesture (i.e. gesture 150) selecting content and other touch based gestures. For example, gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that are in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Layout manager 26 is configured to incrementally layout and render items as the items are available and determined to be ready to render. According to an embodiment, layout manager 26 obtains content items from a content provider/store 120 (e.g. a server) in a modified-time order (e.g. most recently modified item first). Layout manager 26 determines when the obtained items are ready to render using a list of the un-rendered items sorted based on the creation time for the item. Instead of displaying the items in an order they are received, layout manager 26 determines the layout of the items based on the sorted creation time.

Layout manager 26 performs a layout of the items ready to render within a column comprising tiles. The tiles within a column may be a same size and/or different sizes. According to an embodiment, the tiles include a single unit height tile, a one and a half unit height tile, a two height unit tile and a three height unit tile. The tiles may be different sizes and/or shapes. The column size may range from a one height tile to an N height tile size. The column size may be based on a display resolution and/or different considerations (e.g. size of font used to display text, desired resolution of pictures, . . . ). Generally, the size of the columns range between about three units and eight units. According to an embodiment, layout manager 26 determines a selection of a tile in which to place an item based on the content of the item. For example, text is placed in a one unit tile or a one and a half unit tile while rich content (e.g. images, graphs, ...) is placed in a larger unit tile such as a two unit tile or a three unit tile. Layout manager 26 arranges each column to be a same height and selects the tile units to create the desired height (e.g. see FIG. 3 and related description).

Display 115 shows an exemplary display of content items arranged in different sized tiles within columns having an equal height (e.g. height of 6 units). Column 116 shows content items that comprise text content included in four tiles having a unit size of one and a half. Column 117 shows content items that comprise rich content included in two tiles having a unit size of three. In the current illustration, the rich content placed in the lower tile in column 117 is a live tile that shows an animation of at least a portion of the rich content included within the tile. According to an embodiment, a live tile may be selected (e.g. tapping on the tile) in order to display an expanded view of the rich content 121. Column 118 shows content items that comprise rich content included in a first tile having a unit size of 2, followed by rich content in a second tile having a unit size of 3, followed by text content in a third tile having a unit size of 1. Column 119 shows content items that comprise text content included in a first tile having a unit size of 1, rich content included in a second tile having a unit size of 2, followed by rich content in a third tile having a unit size of 2, followed by text content in a fourth tile having a unit size of 1.

Content items are obtained and dynamically arranged in different sized tiles within columns (e.g. columns of a same size) on a display. The obtained items, along with previously obtained items that have not been rendered, are sorted based on a time (e.g. a creation time). A determination is made using the sorting as to whether any of the items are ready to render. The determination of whether an item is ready to render may be made before all of the content items are obtained. A layout within the tile(s) for the column for the ready to render items is determined. For example, the items may be placed in tiles based on their content (e.g. text content placed in smaller sized tiles as compared to rich content). An item may be placed in a live tile that animates a display of content that is associated with the item. The items that are determined to be ready to render are sent for rendering. More details regarding the interactive performance assessment are provided below.

Figure 2:
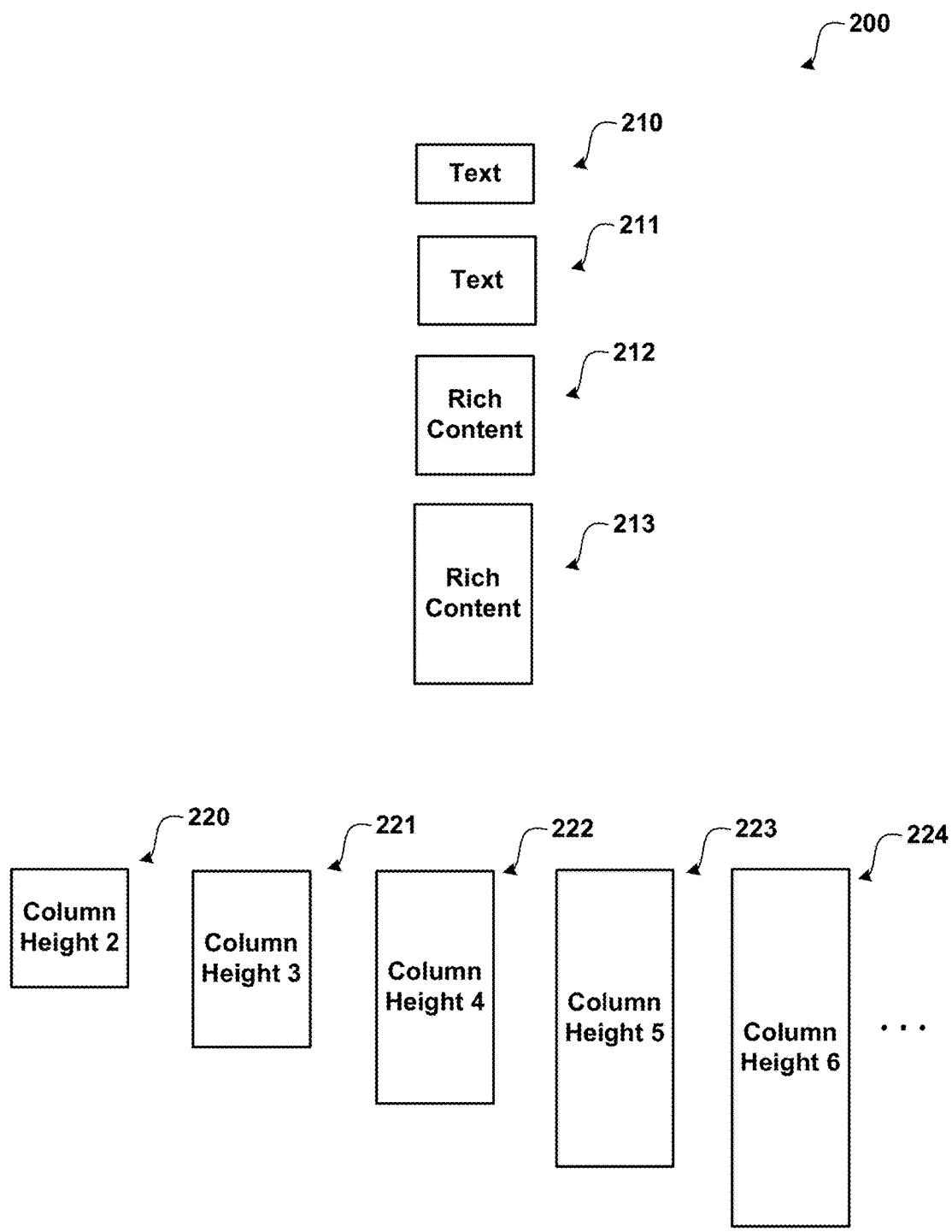
FIG. 2 shows a view of different sized tiles and columns.

FIG. 2 shows a view of different sized tiles and columns. As illustrated, FIG. 2 includes four different sized tiles (210, 211, 212, and 213) and five columns of different heights (220, 221, 222, 223, and 224).

The different sized tiles are used to create columns of a same height for a display. The equally sized columns and/or approximately equally sized columns may be shown on displays having a standard/large display (e.g. displays larger than 12 inches) as well as a device having a limited display size (e.g. a cell phone having a display of approximately 2 by 3 inches, a slate/tablet having approximately a 7-10 inch display, and/or other devices having other display sizes (e.g. 4, 5, 6,).

Tile 210 is a tile having a height of one unit. Tile 211 is a tile having a height of one and a half units. Tile 212 is a tile having a height of two units. Tile 213 is a tile having a height of three units. The different sized tiles may be combined to create a column having a same height. According to an embodiment, items are placed into a tile based on the content of the item. For example, textual content is placed into one of the smaller tiles (210 and 211) and rich content (e.g. pictures, images, graphs, ...) is placed into one of the larger tiles (212 and 213). A column is created by combining one or more tiles of one or more different sizes.

Figure 3:
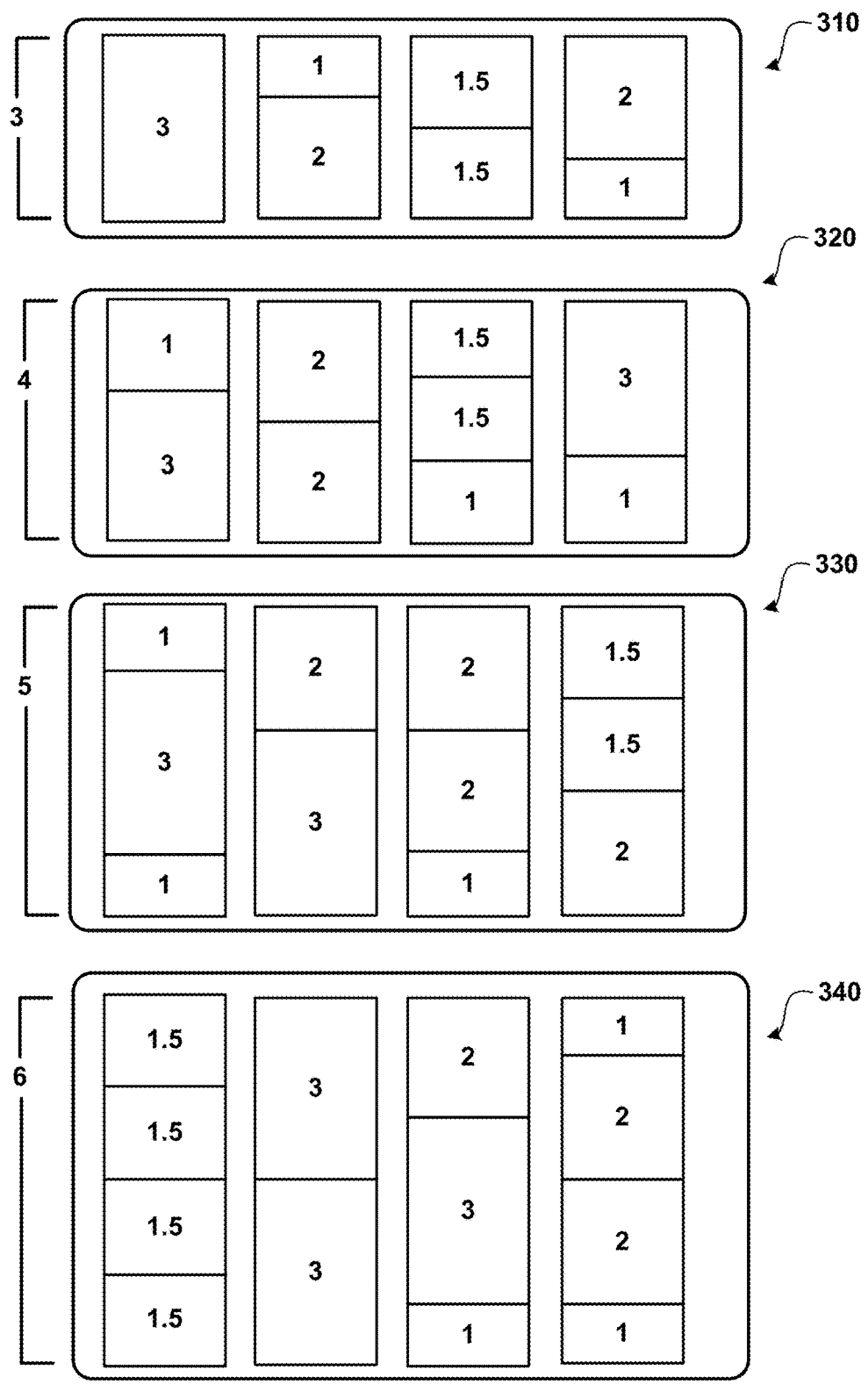
FIG. 3 shows different displays having differently sized columns.

FIG. 3 shows different displays having differently sized columns. As illustrated, FIG. 3 includes four display including display 310, display 320, display 330 and display 340. The illustrations are for explanatory purposes and are not intended to be limiting. While different sized tiles are shown in each of the different columns, the different columns may also have the same size tiles.

Display 310 illustrates a display of tiles within four columns having a height of three. While four columns are shown, more or fewer columns may be displayed. The first column includes a single tile having a height of three. The second column includes a tile having a height of one and a second tile having a height of two. The third column has a first tile having a height of one and a half and a second tile having a height of one and a half. The fourth column has a first tile having a height of two and a second tile having a height of one.

Display 320 illustrates a display of tiles within four columns having a height of four. While four columns are shown, more or fewer columns may be displayed. The first column includes a first tile having a height of one and a second tile having a height of three. The second column includes a first tile having a height of two and a second tile having a height of two. The third column has a first tile having a height of one and a half, a second tile having a height of one and a half, and a third tile having a height of one. The fourth column has a first tile having a height of three and a second tile having a height of one.

Display 330 illustrates a display of tiles within four columns having a height of five. While four columns are shown, more or fewer columns may be displayed. The first column includes a first tile having a height of one, a second tile having a height of three and a third tile having a height of one. The second column includes a first tile having a height of two and a second tile having a height of three. The third column has a first tile having a height of two, a second tile having a height of two and a third tile having a height of one. The fourth column has a first tile having a height of one and a half, a second tile having a height of one and a half, and a third tile having a height of one.

Display 340 illustrates a display of tiles within four columns having a height of six. While four columns are shown, more or fewer columns may be displayed. The first column includes a first tile having a height of one and a half, a second tile having a height of one and a half, a third tile having a height of one and a half and a fourth tile having a height of one and a half. The second column includes a first tile having a height of three and a second tile having a height of three. The third column has a first tile having a height of two, a second tile having a height of three and a third tile having a height of one. The fourth column has a first tile having a height of one, a second tile having a height of two, a third tile having a two, and a fourth tile having a height of one.

Other column heights may be used along with different combinations of tiles.

Figure 4:
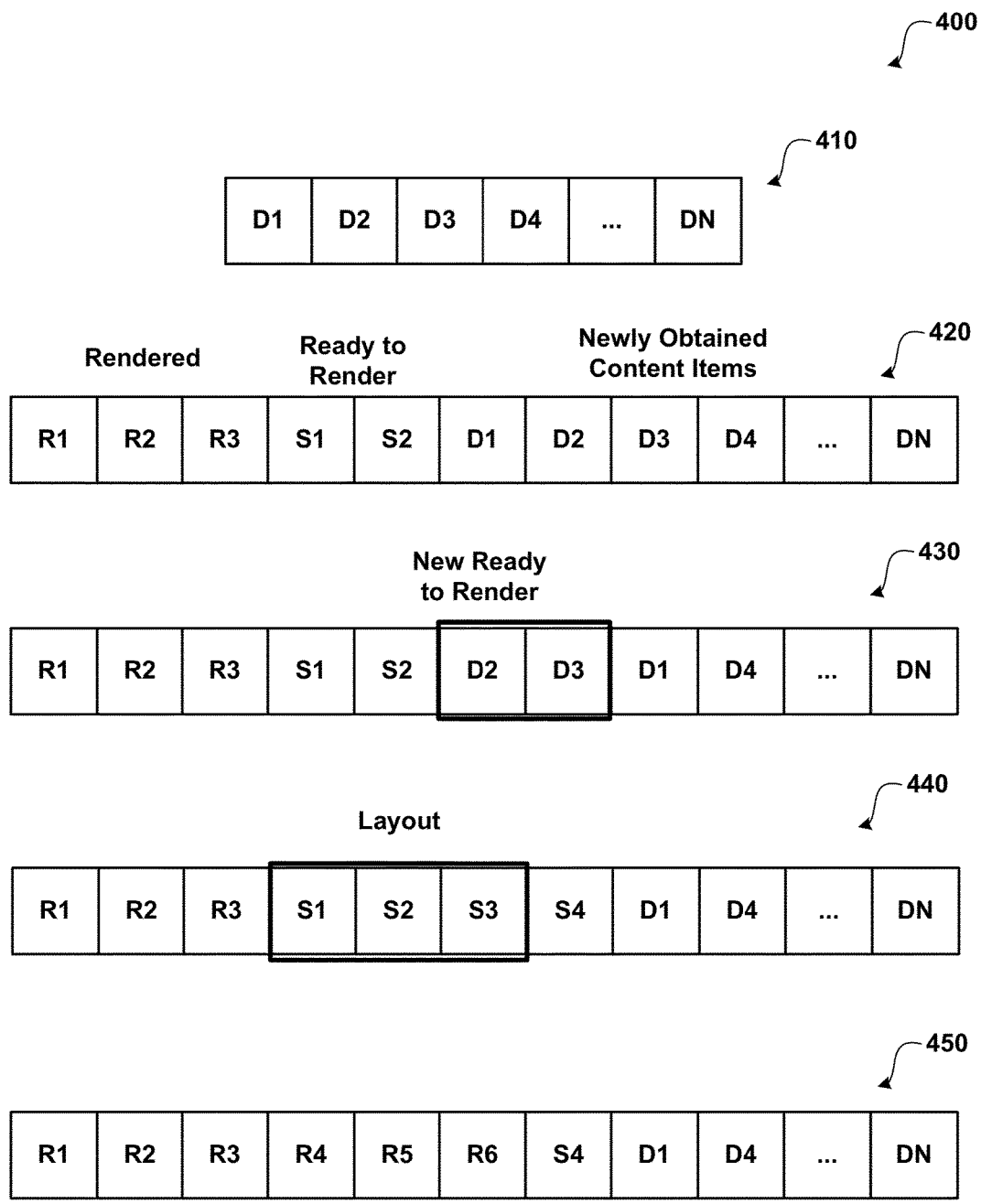
FIG. 4 illustrates obtaining content items and dynamically rendering content items.

FIG. 4 illustrates obtaining content items and dynamically rendering content items. As illustrated, FIG. 4 includes four lists of content items (410, 420, 430, 440 and 450).

List 410 illustrates obtaining N content items (D1-DN) from a content source (e.g. a server, an external data store, a news feed, ...). The content items may comprise a variety of content such as text, rich content (e.g. pictures, charts, ...) and the like. According to an embodiment, instead of obtaining a large amount of data in a single request to a data source, more requests for smaller amounts of data are made. Each content item in a list includes a creation time and a modified time. The creation time is when the content item was initially created and the modified time is a time that the content item was last modified. According to an embodiment, the content items are obtained from the content source in a modified time order (most recently modified first).

List 420 shows a list of content items including content items already rendered (R1, R2, R3), content items marked Ready to Render, and newly obtained content items.

List 430 shows a sorted list of content items by creation time and marking new content items (D2 and D3) ready to render.

List 440 shows a list with content items ready to be laid out in one or more columns. In the current example, content items S1, S2 and S3 are laid out in a column. For example, assume that content item is a picture and content items S2 and S3 are text. In a column having a height of six, a two height tile could be used for the picture and a one and a half height tile could be used for S2 and a second one and a half height tile could be used for S3. In a column having a height of three, a three height tile in one column could be used for the picture and a second column could include the text content items (a one and a half height tile could be used for S2 and a second one and a half height tile could be used for S3). According to an embodiment, the content is not rendered until a complete column is created by ready to render items. In the current column, item S4 is not rendered since a complete column is not yet created.

List 450 shows a list of content items including content items already rendered (R1, R2, R3, R4, R5 and R6) and content items not determined to be ready to render.

Figure 5:
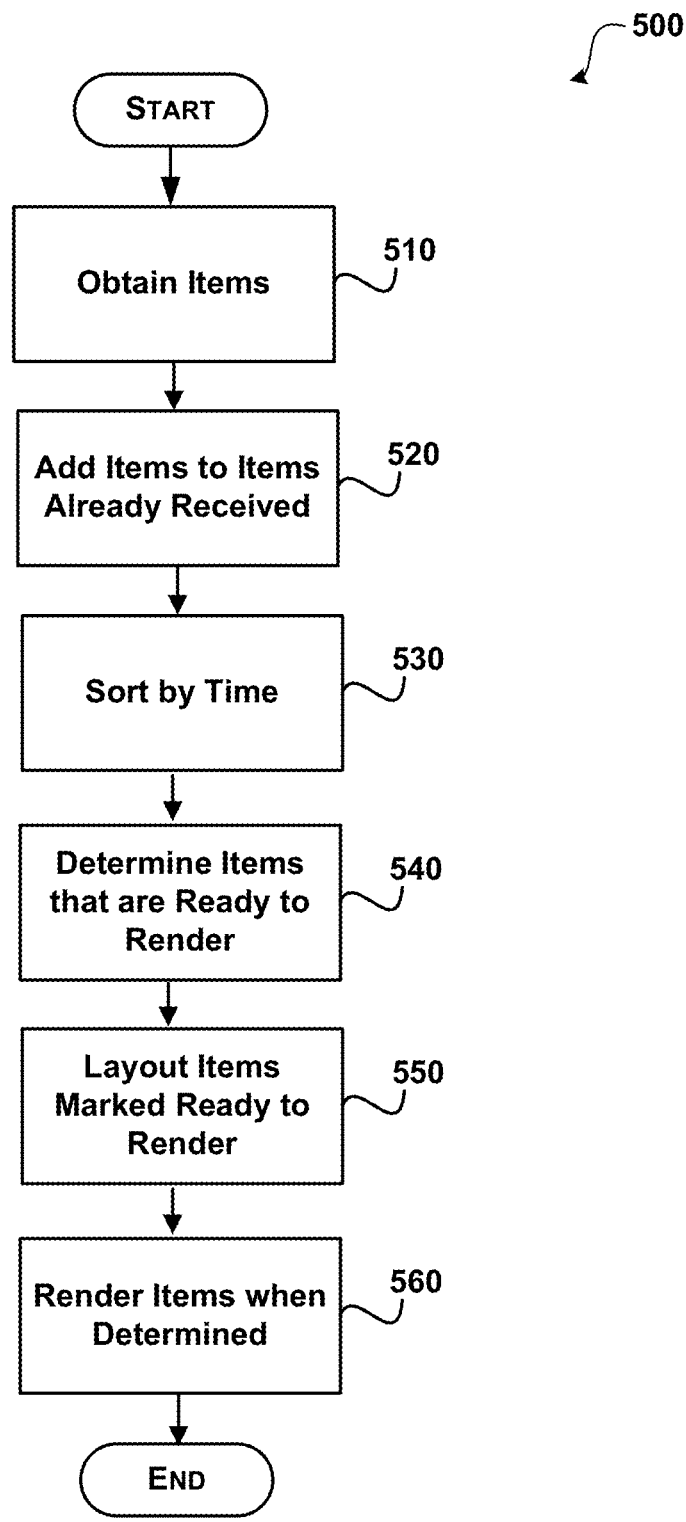
FIG. 5 shows an illustrative processes for a dynamic layout of content in a grid based application.

FIG. 5 shows an illustrative process 500 for a dynamic layout of content in a grid based application. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 510, where content items are obtained. According to an embodiment, the content items are obtained from an external data source, such as a server, in modified time order. Instead of displaying the content items in an order they are received, the content items are displayed in a create time order and are arranged in columns having an equal (or approximately equal) height. Each content item received includes a modified time and a creation time of when the content item was created.

Flowing to operation 520, the newly obtained items are added to any content items that have already been obtained. For example, ten new content items may be obtained that are added to a current list of five content items.

Moving to operation 530, the list of content items (newly obtained and previous) is sorted based on the creation time for each content item. The location in the list of items already rendered or ready to render are unaffected by subsequent sorts.

Transitioning to operation 540, a determination is made as to whether any of the content items in the sorted list are ready to render. A content item is determined to be ready to render when the content item was created more recently than the oldest of the modified times of content items already obtained. For example, if an item modified on Sep. 4, 2012 has been obtained then an item created on Sep. 5, 2012 is safe to render.

Flowing to optional operation 550, the content items determined to be ready to render are laid out in a column having a determined height. For example, a desired column height may be a height of 7. The content items are placed into tiles such that the height of the tiles used to display the content add up to the desired column height. If there are not enough items to make a complete column, the layout is deferred until more items are available. According to an embodiment, one or more content items may be placed into a live tile such that at least a portion of the content associated with the item is animated when it is displayed in the live tile. For example, a live tile may be used when some of the content in the content item would be truncated in a static tile. According to another embodiment, content items that have a creation date of a different day are displayed in different columns. For example, a new column may be started on each new day.

Transitioning to operation 560, the laid out items are rendered when determined. According to an embodiment, the laid out items are rendered when a full column is filled with tiles. For example, if a column is not completely filled, the process may wait until the column is filled with content obtained in the future. As discussed above, according to an embodiment, both the layout and the rendering of the items are deferred until a complete column is determined. For example, when a computed layout is only partial and does not fill the column, the layout is discarded and then retried when more items are available. The process then moves to an end operation and returns to processing other actions.

Figure 6:
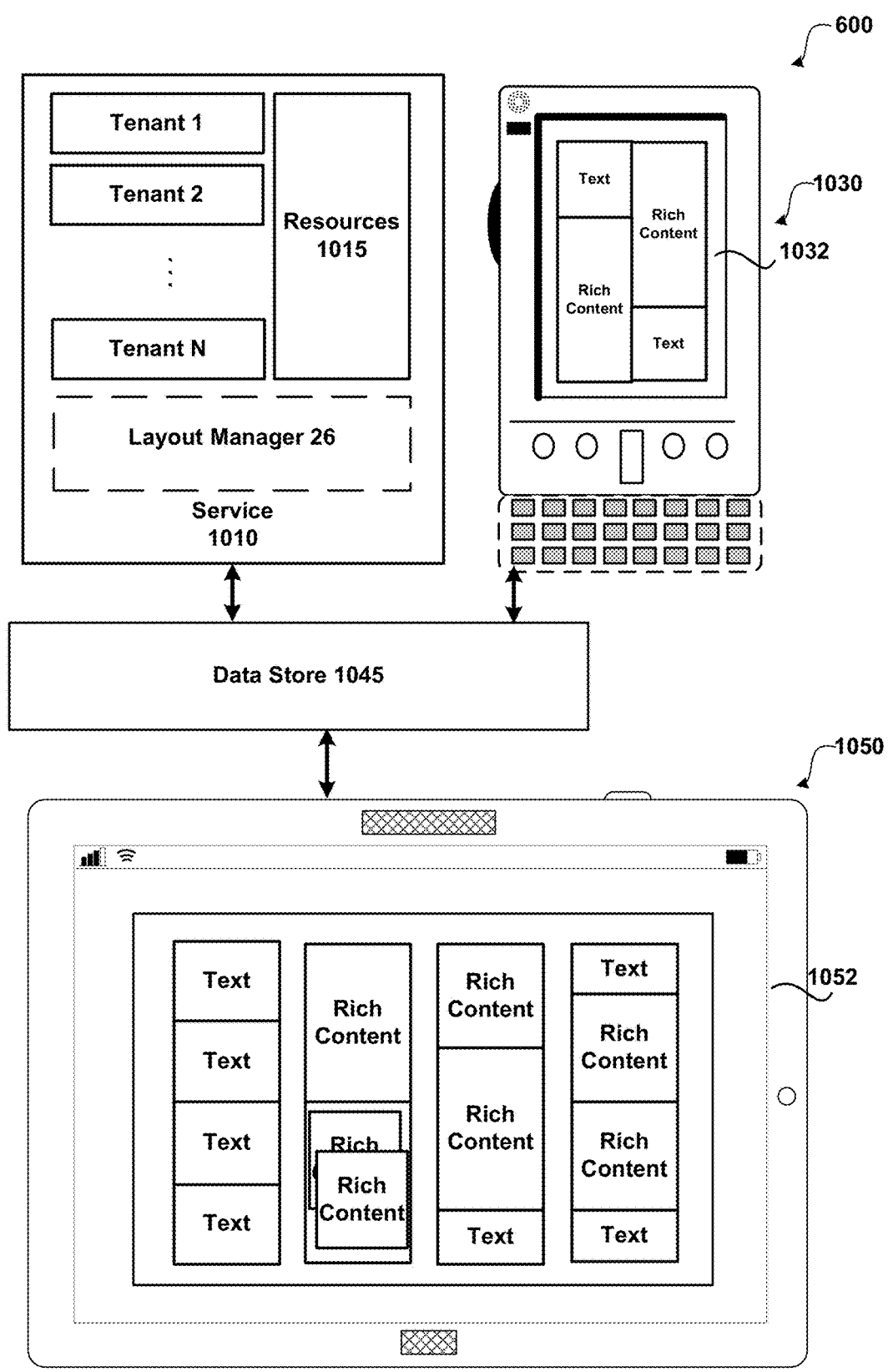
FIG. 6 illustrates an exemplary system for dynamic layout of content.

FIG. 6 illustrates an exemplary system for dynamic layout of content. As illustrated, system 1000 includes service 1010, data store 1045, touch screen input device/display 1050 (e.g. a slate) and smart phone 1030. Why is Layout Manager 26 included in service 1010? It should be entirely inside the local device 1050.

As illustrated, service 1010 is a cloud based and/or enterprise based service that may be configured to provide services, such as productivity services (e.g. MICROSOFT OFFICE 365 or some other cloud based/online service that is used to interact with content (e.g. spreadsheets, documents, presentations, charts, messages, and the like). The service may be interacted with using different types of input/output. For example, a user may use touch input, hardware based input, speech input, and the like. The service may provide speech output that combines pre-recorded speech and synthesized speech. Functionality of one or more of the services/applications provided by service 1010 may also be configured as a client/server based application. Although system 1000 shows a service relating to a productivity application such as a collaboration application, other services/applications may be configured.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with presentation applications.

As illustrated, touch screen input device/display 1050 and smart phone 1030 shows exemplary displays 1052/1032 showing the use of an application having content dynamically laid out in columns having a same height. Display 1052 illustrates a four column display. Display 1032 illustrates a two column display. Data may be stored on a device (e.g. smart phone 1030, slate 1050 and/or at some other location (e.g. network data store 1045). The applications used by the devices may be client based applications, server based applications, cloud based applications and/or some combination.

Layout manager 26 is configured to perform operations relating to the dynamic layout of content as described herein. While manager 26 is shown optionally within service 1010, the functionality of the manager may be included in other locations (e.g. on smart phone 1030 and/or slate device 1050). According to an embodiment, layout manager may be included on the computing devices themselves (e.g. 1030 and 1050) and not included in a service, such as service 1010. The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
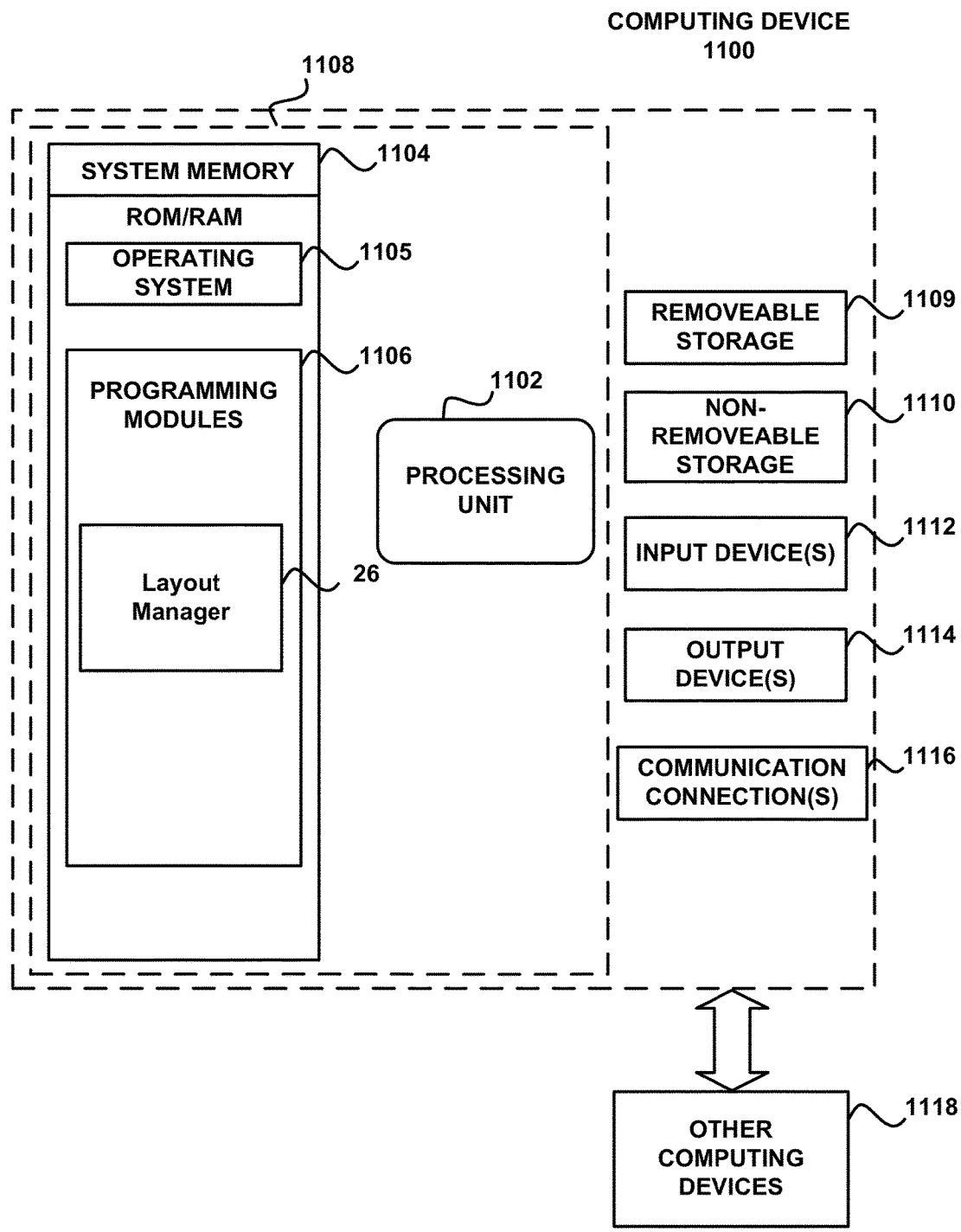
FIGS. 7-9 and the associated descriptions provide a discussion of a variety of operating environments in which embodiments of the invention may be practiced.
Figure 8A:
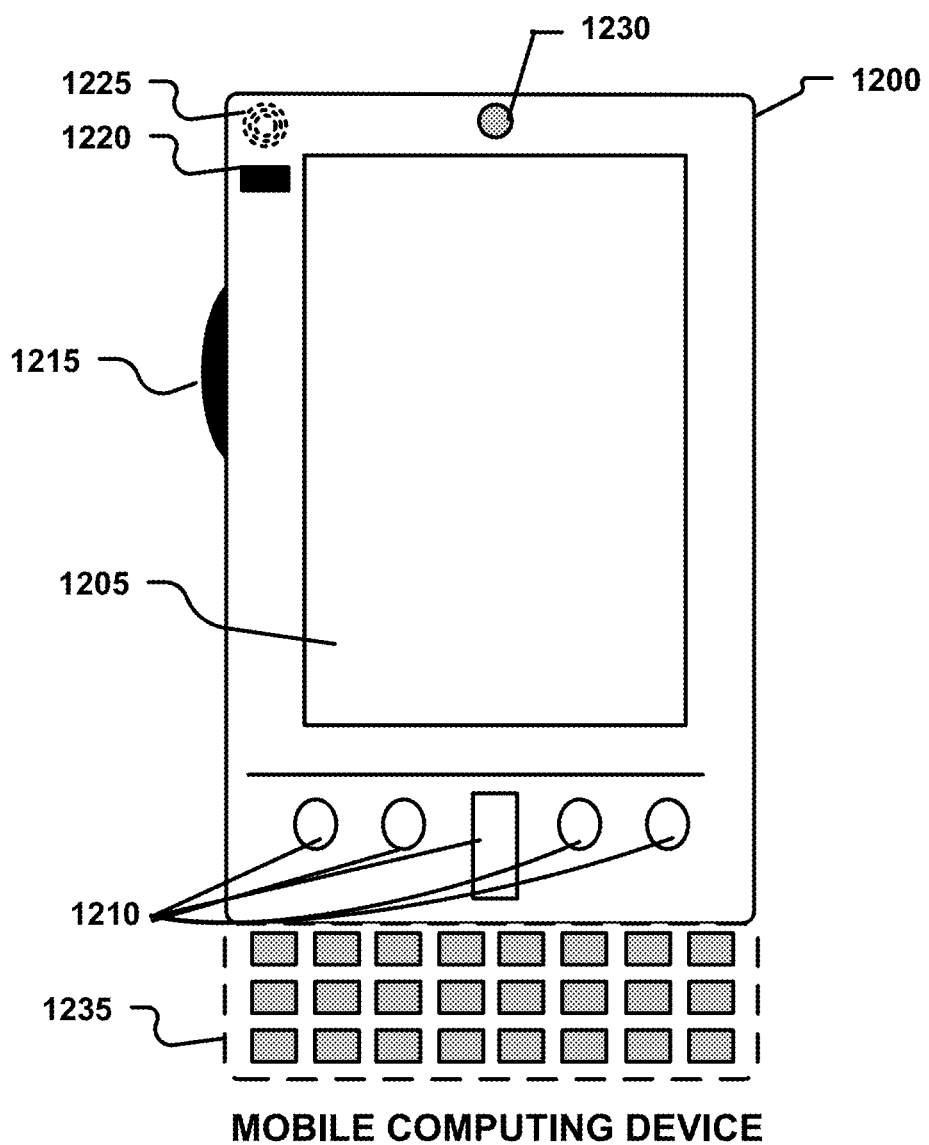
Figure 8B:
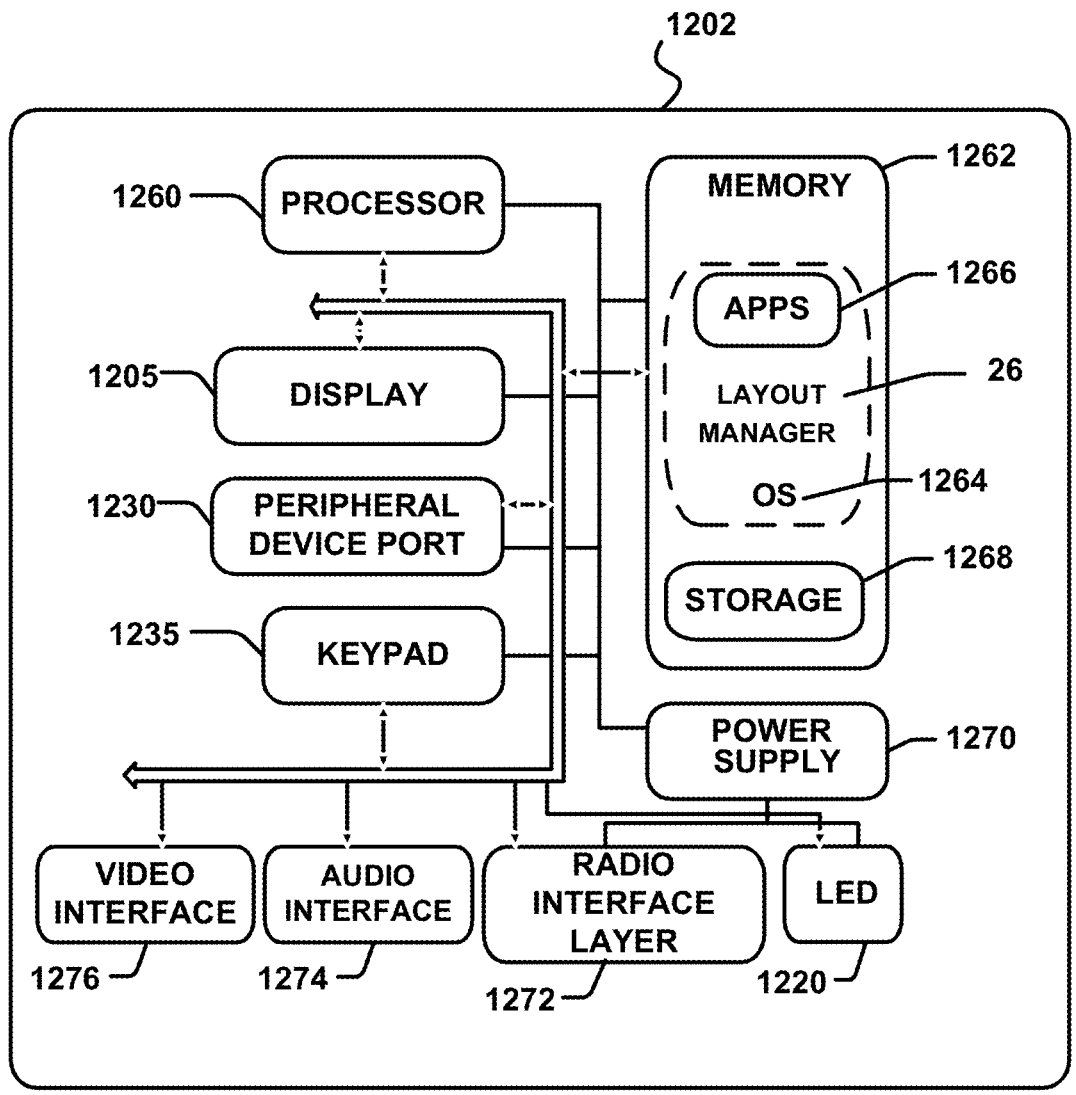
Figure 9:
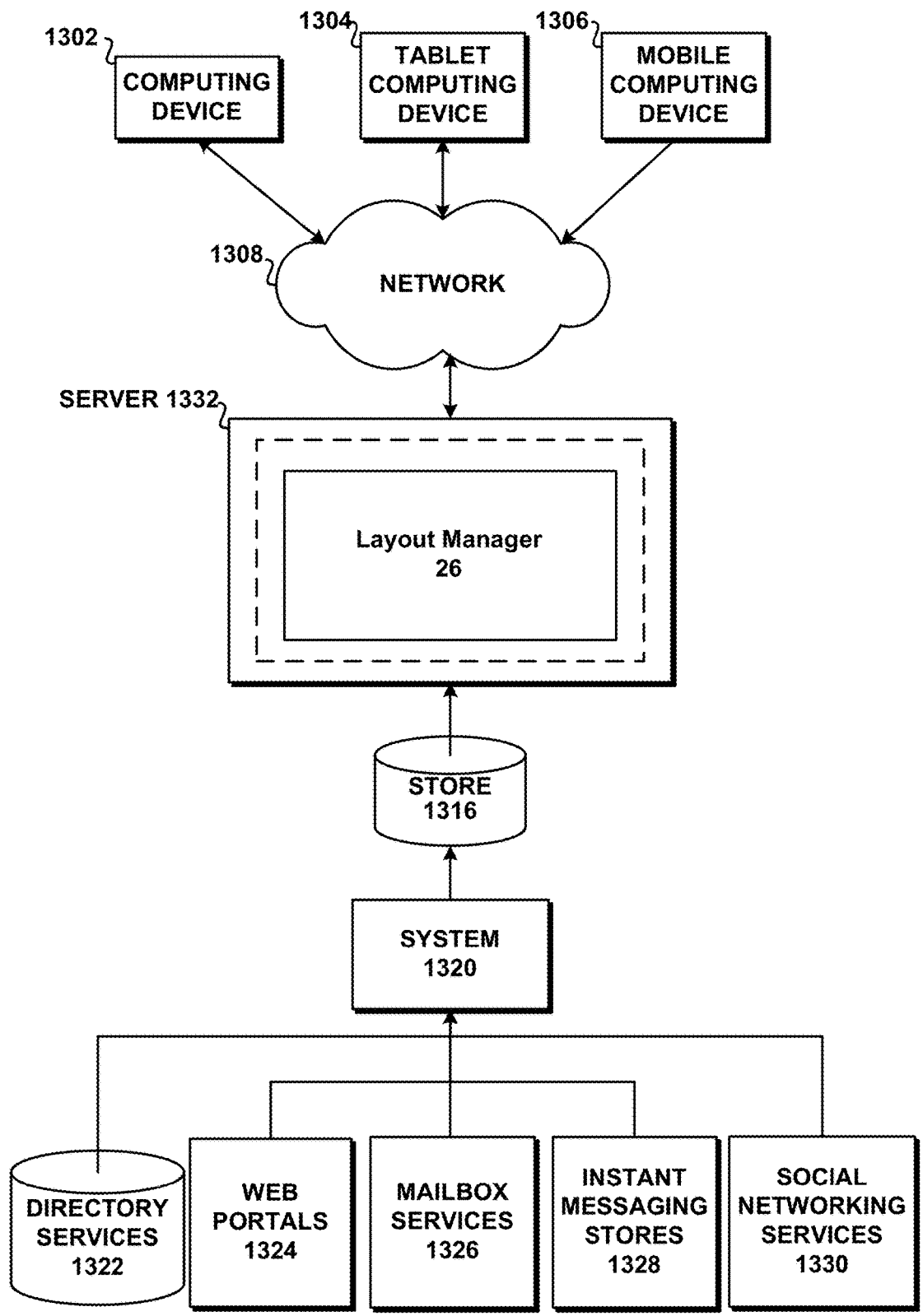

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a layout manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 7 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like.

Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a suitable mobile computing environment, for example, a mobile telephone, a smartphone, a tablet personal computer, a laptop computer, and the like, with which embodiments of the invention may be practiced. With reference to FIG. 8A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 8B is a block diagram illustrating components of a mobile computing device used in one embodiment, such as the computing device shown in FIG. 8A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the layout manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 12B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 9 illustrates a system architecture for dynamic layout of content.

Components managed via the layout manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to creating an application using shared code across different platforms. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for dynamic layout of content, comprising:
   receiving, by a computing device, one or more content items from an external data source, wherein the one or more content items are ordered by modification time;
   adding the one or more content items to one or more previously-received items to generate a list of content items, wherein the previously-received items are received by the computing device prior to receiving the one or more content items;
   sorting the list of content items by creation date;
   comparing respective creation dates of the one or more content items to respective modification times of the one or more previously-received items;
   when the comparison identifies one or more creation dates that are more recent than one or more modification times, identifying the corresponding one or more content items as ready to render items;
   determining a layout for the ready to render items, wherein the determining comprises placing one or more of the ready to render items in different sized tiles, and arranging the different sized tiles in two or more columns such that the arrangement of the different sized tiles causes the two or more columns to have an approximately equal height; and
   rendering the two or more columns having the approximately equal height based on the layout, wherein the rendering comprises suppressing columns comprising the different sized tiles when the different sized tiles cannot be arranged in a column having the approximately equal height.

2. The method of claim 1, further comprising delaying the rendering of the one or more ready to render items until a column is filled using the one or more ready to render items.

3. The method of claim 1, further comprising starting a new column based on a different creation date.

4. The method of claim 1, wherein determining a layout comprises determining a size to display the one or more ready to render items based on whether the one or more ready to render items is a text item or a rich content item.

5. The method of claim 4, further comprising placing the one or more ready to render items in a tile having a height selected from the group consisting of one tile, one and a half tiles, two tiles and three tiles.

6. The method of claim 4, wherein rich content is placed in a tile sized to at least two tiles.

7. The method of claim 4, wherein a column height is at least three tiles high.

8. The method of claim 1, further comprising placing the one or more ready to render items in a live tile that animates content within the tile.

9. The method of claim 8, further comprising receiving a selection of the live tile and displaying an expanded view of the content associated with the live tile.

10. A computer-readable storage device storing computer-executable instructions for dynamic layout of content, comprising:
    receiving one or more content items from an external data source, wherein the one or more content items are ordered by modification time;
    adding the one or more content items to one or more previously-received items to generate a list of content items, wherein the previously-received items are received by the computing device prior to receiving the one or more content items;
    sorting the list of content items and previously-received content by creation date;
    determining the respective creation date of the one or more content items is more recent than a modification time of the previously-received content;
    based on determining the respective creation date is more recent than the modification time, determining the one or more content items comprise one or more ready to render items;
    determining a layout for the ready to render items, wherein the determining comprises placing one or more of the ready to render items in different sized tiles, and arranging the different sized tiles in two or more columns such that the arrangement of the different sized tiles causes the two or more columns to have an approximately equal height; and
    rendering the ready to render items based on the layout, wherein the layout specifies rendering a column that is filled to a determined column height and suppressing a column when the different sized tiles cannot be arranged to fill the column to the determined column height.

11. The computer-readable storage device of claim 10, wherein determining a layout comprises placing the ready to render items in a tile having a height selected from the group consisting of one tile, one and a half tiles, two tiles and three tiles.

12. The computer-readable storage device of claim 11, wherein rich content is placed in a tile sized to at least two tiles.

13. The computer-readable storage device of claim 11, wherein a column height is at least three tiles high.

14. The computer-readable storage device of claim 10, further comprising placing the ready to render items in a live tile that animates content within the tile.

15. The computer-readable storage device of claim 14, further comprising receiving a selection of the live tile and displaying an expanded view of the content associated with the live tile.

16. A system for dynamic layout of content, comprising:
    a display that is configured to receive touch input;
    a processor and memory;
    an operating environment executing using the processor;
    a display; and
    a layout manager that is configured to perform actions comprising:
       receiving one or more content items from an external data source, wherein the one or more content items are ordered by modification time;

adding the one or more content items to one or more previously-received items to generate a list of content items, wherein the previously-received items are received by the computing device prior to receiving the one or more content items;

sorting the list of content items based on the creation date;

determining the respective creation date of the one or more content items is more recent than a modification time of the previously-received content;

based on determining the respective creation date is more recent than the modification time, determining the one or more content items comprise one or more ready to render items;

determining a layout for the ready to render items, wherein the determining comprises placing one or more of the ready to render items in different sized tiles, and arranging the different sized tiles in two or more columns such that the arrangement of the different sized tiles causes the two or more columns to have an approximately equal height; and rendering the ready to render items based on the layout, wherein the layout specifies rendering a column that is filled to a determined column height and suppressing a column that is not filled to the determined column height.

17. The system of claim 16, wherein determining a layout comprises placing the ready to render items in a tile having a height selected from the group consisting of one tile, one and a half tiles, two tiles and three tiles.

18. The system of claim 16, wherein rich content is placed in a tile sized to at least two tiles.

19. The system of claim 16, further comprising placing the ready to render items in a live tile that animates content within the tile.

20. The system of claim 19, further comprising receiving a selection of the live tile and displaying an expanded view of the content associated with the live tile.

* * * * *